Figure 1:
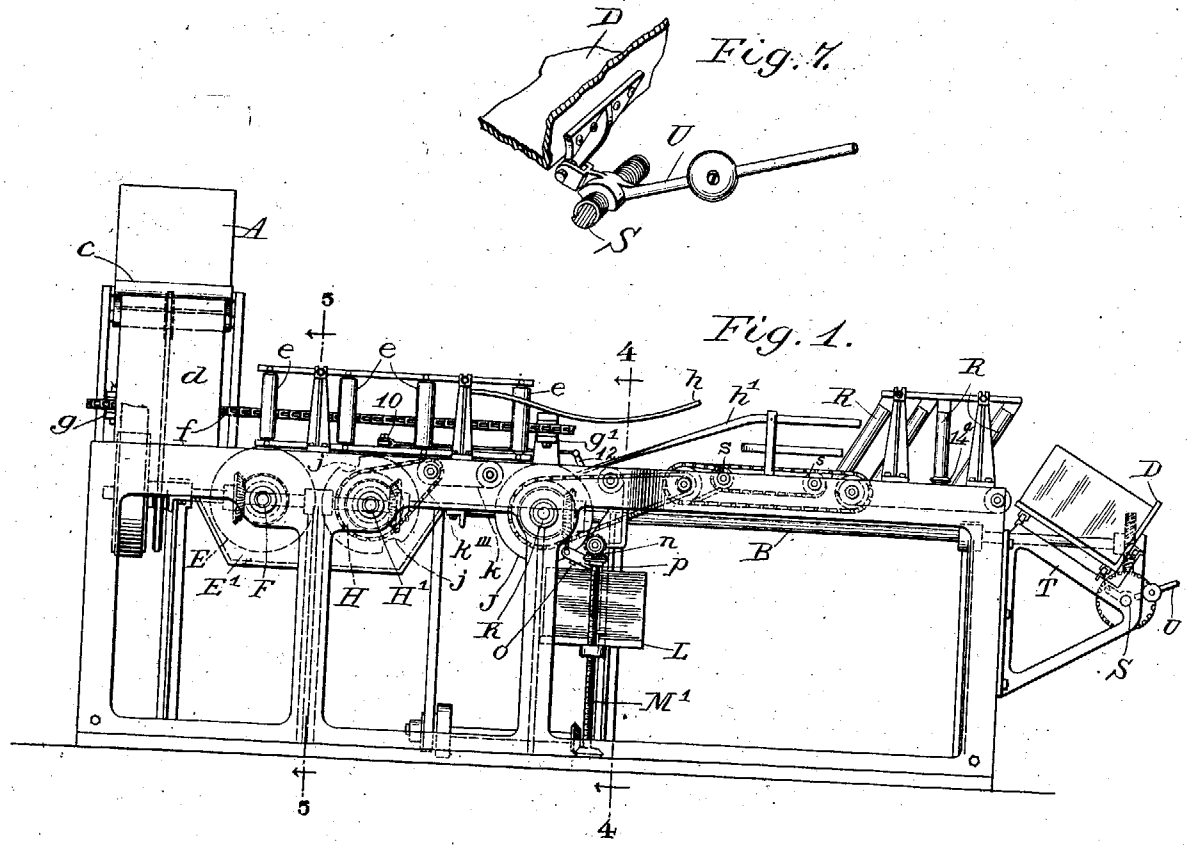

P. PACHTER.

PAMPHLET COVERING MACHINE.

APPLICATION FILED JAN. 16, 1917.

Reissued Dec. 10, 1918.

14,560.

5 SHEETS—SHEET 1.

Inventor

Peter Pachter,

By his Attorneys,

Hedman, Brent

P. PACHTER.

PAMPHLET COVERING MACHINE.

APPLICATION FILED JAN. 16, 1917.

Reissued Dec. 10, 1918.

14,560.

5 SHEETS—SHEET 2.

Peter Pachter, Inventor

By his Attorneys

Heidman & Steed

P. PACHTER.

PAMPHLET COVERING MACHINE.

APPLICATION FILED JAN. 16, 1917.

Reissued Dec. 10, 1918.

14,560.

5 SHEETS—SHEET 3.

Peter Pachter Inventor

By his Attorneys

Heidman & Stred.

P. PACHTER.

PAMPHLET COVERING MACHINE.

APPLICATION FILED JAN. 16, 1917.

Reissued Dec. 10, 1918.

14,560.

5 SHEETS—SHEET 4.

Peter Pachter, Inventor.

By his Attorney,

Seidman Strauss

P. PACHTER.
PAMPHLET COVERING MACHINE.
APPLICATION FILED JAN. 16, 1917.
Reissued Dec. 10, 1918.
14,560.
5 SHEETS—SHEET 5.
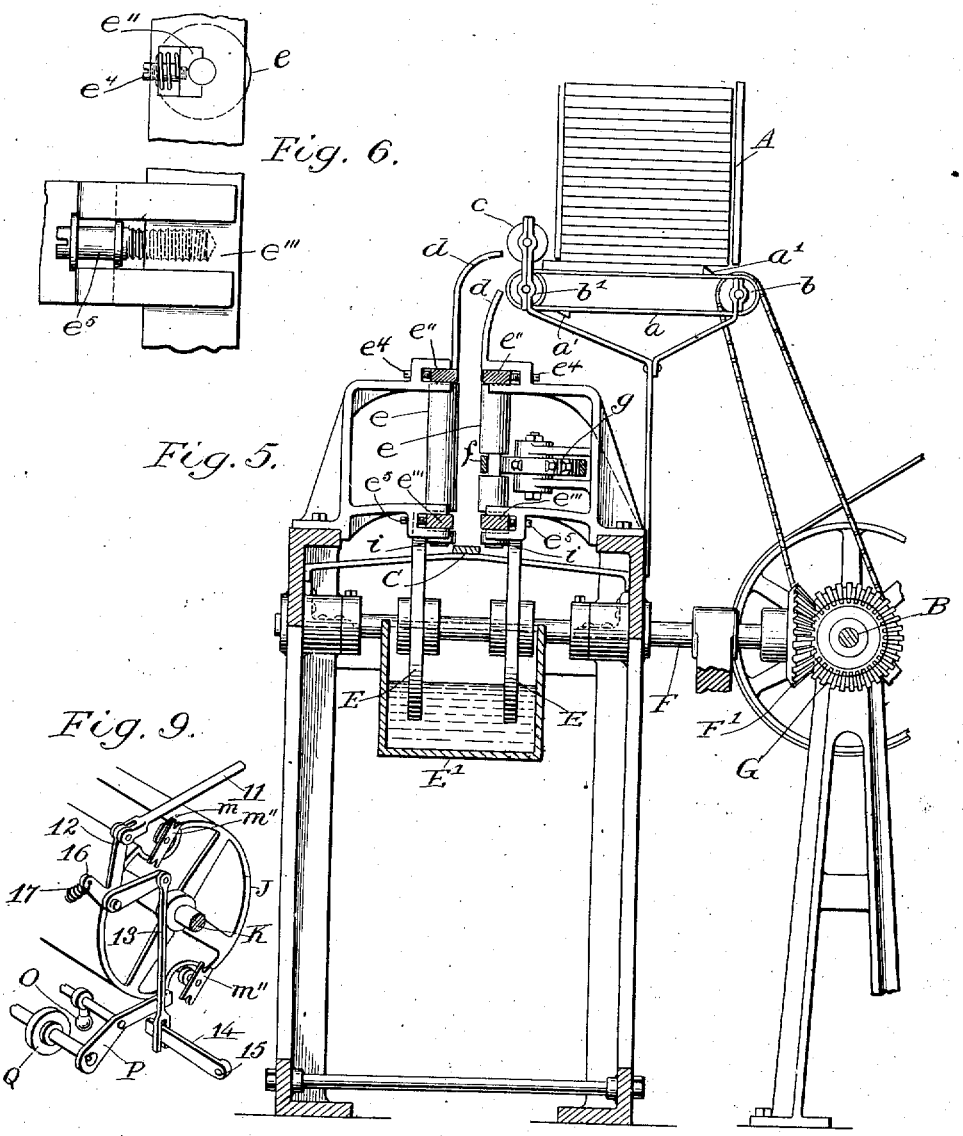
Inventor
Peter Pachter,
By his Attorneys
Heidman & Brock

UNITED STATES PATENT OFFICE.

PETER PACHTER, OF CHICAGO, ILLINOIS, ASSIGNOR, BY DIRECT AND MESNE ASSIGNMENTS, OF ONE-HALF TO T. W. & C. B. SHERIDAN CO., A CORPORATION OF NEW YORK, AND ONE-HALF TO SHERIDAN IRON WORKS, OF CHAMPLAIN, NEW YORK, A CORPORATION OF NEW YORK.

PAMPHLET-COVERING MACHINE.

14,560. Specification of Reissued Letters Patent. Reissued Dec. 10, 1918.

Original No. 1,033,265, dated July 23, 1912, Serial No. 509,572, filed July 26, 1909. Application for reissue filed January 16, 1917. Serial No. 142,754.

*To all whom it may concern:*

Be it known that I, PETER PACHTER, a citizen of the United States, and resident of Chicago, in the county of Cook and State of Illinois, have invented a certain new and useful Improvement in Pamphlet-Covering Machines, of which the following is a description.

My invention relates to a machine for attaching the paper or other flexible covers to a book or pamphlet, and has for its object the provision of a single machine whereby the covers will not only be secured to the back of the book or pamphlet but also to the sides for a predetermined distance, thereby providing the book or pamphlet with a cover more firmly secured in place than is the case with the method of machines at present in use, and at the same time having the covers take over the stitches or staples employed to bind the book or pamphlet, thus producing a very much neater appearing book or pamphlet.

A further object of the invention is to provide a machine that will not only be automatic in its operation and will permit of its adaptation to books or pamphlets of varying sizes; but will be continuous in its operation, thereby giving it greater capacity than that of the machines now employed, which operate intermittently; furthermore, my improved machine does not possess the serious objections found in the intermittent type of machines at present employed towit the jar and vibration caused by the frequent starting and stopping of such type of machine, which is not only a wear and tear on the machine itself but also on the structure in which it is located, also creating considerable noise.

To the attainment of the objects and advantages referred to this invention consists in the novel machine combinations, mechanisms and devices herein illustrated or described; each constructed to coöperate in securing or enabling continuous advancing travel of the pamphlets or other books, and the mechanisms which operate upon the book specifically being progressive in their action, and preferably of a rotary nature, so that not only interruptions of pamphlet travel are avoided, but also the need of bodily reciprocating the several mechanisms. In its complete aspect the machine of this invention comprises the following mechanisms: The first mechanism is a conveyer by which a succession of pamphlets are held, guided and carried or advanced with a continuous and preferably steady travel from the book infeeding point throughout the several operations to the delivery; specifically this comprises a guiding raceway together with an endless device or chain having jutting-out pamphlet-engaging members which properly determine the longitudinal position or spacing of the successive pamphlets, which advance in a vertical plane with their backs exposed downwardly. The next mechanism is one for automatically feeding or introducing the successive pamphlets one at a time into their proper positions in the traveling conveyer, preferably by an infeeding movement at an angle or transversely to the direction of conveyer travel. The next mechanism is an automatic adhesive applying means arranged to operate progressively to apply glue to the backs of the books advancing in the conveyer; specifically this comprises glue rollers beneath the conveyer arranged to apply glue not merely to the back, but to the rear margins of the opposite sides of the pamphlet, a recess in the roller serving to restrict the adhesive to pre-arranged points. The next mechanism comprises a device of a rotary nature in the form of a cylinder or drum, the periphery of which is tangent to the path of travel of the backs of the books. Said cylinder is adapted to carry or feed the successive covers and apply them progressively to the advancing books by reason of the peripheral travel or rotary movement of the cylinder in unison with the advance of the conveyer, and said cylinder being adapted also for firmly pressing each cover into engagement with the glued back of the book. Coöperating with this rotary cylinder device is a cover-supply support and means for automatically separating the covers one at a time from the supply to be later engaged by the cylinder, which latter has associated with it a peripheral cover-gripping means, so that each cover is securely taken and carried peripherally to the pamphlet.

The presence or absence of the pamphlet controls the operativeness or inoperativeness of the feeding mechanism, so that no cover will be supplied when there is no pamphlet. The next mechanism is for bending, pressing or "breaking" the two opposite sides of the cover against the sides of the pamphlet. This mechanism is located adjacent the conveyer and has portions which advance in unison with the moving pamphlet while acting on the two sides of the cover. Preferably this mechanism is of a rotary nature so as to progressively effect the breaking during the continuous advance of the pamphlet and cover after the uniting of the two by the previous mechanism. The final mechanism is a delivery at the end of the conveyer comprising a suitable receptacle for the completed pamphlets. These combined mechanisms give continuous and progressive operation from the infeeding to the delivery, thus attaining to the fullest extent the objects before mentioned.

The advantages of my invention will more fully appear from the detailed description of the drawings of a machine embodying my invention and which form a part of my specification.

Figure 2:
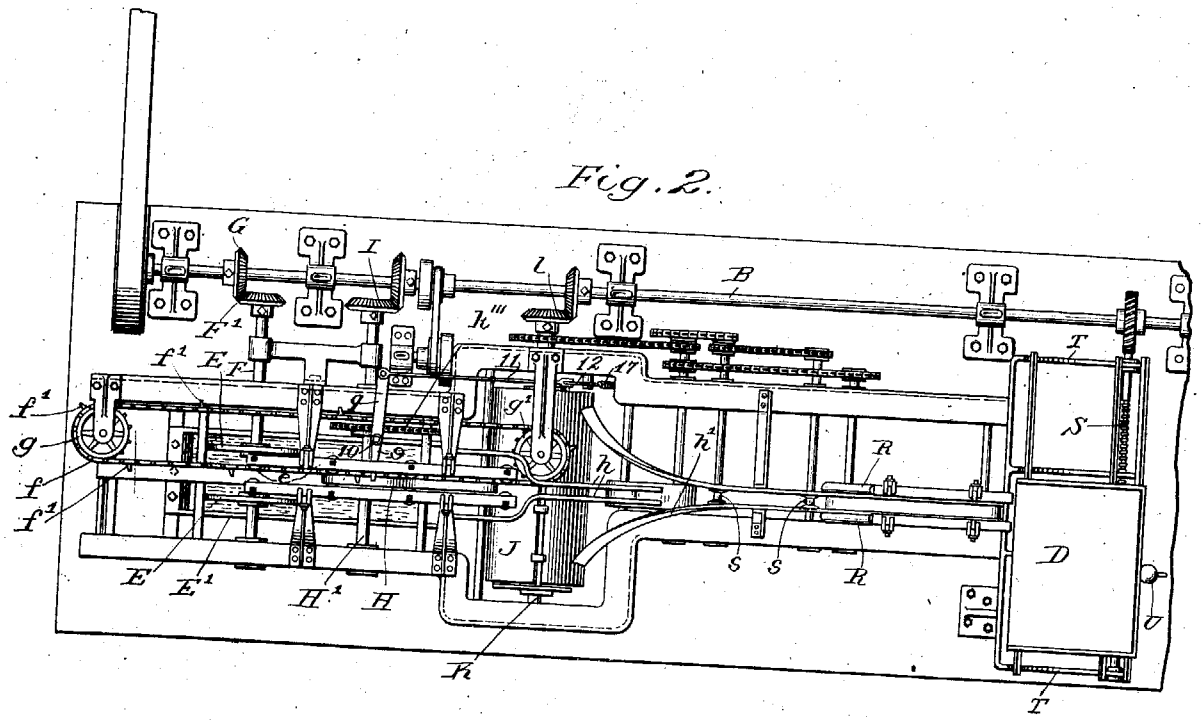
Figure 3:
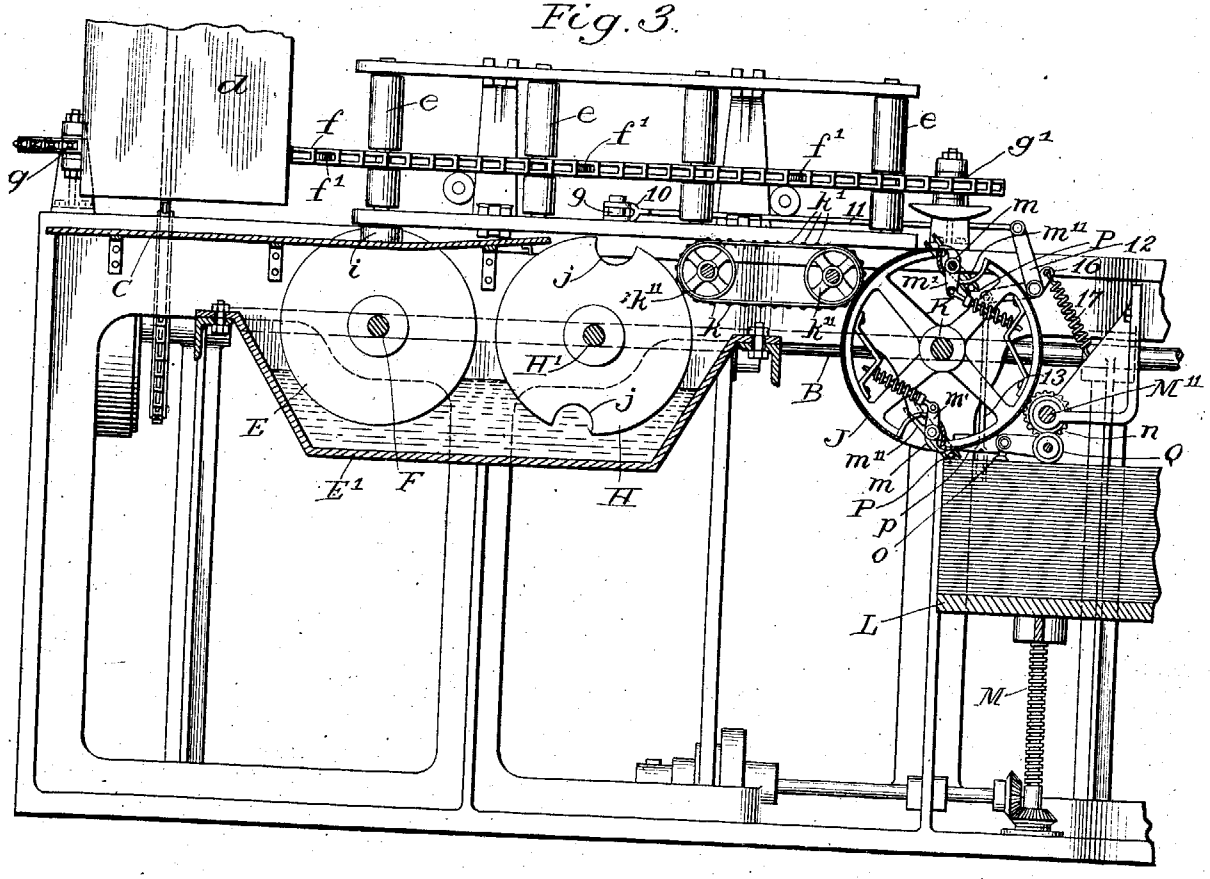
Figure 4:
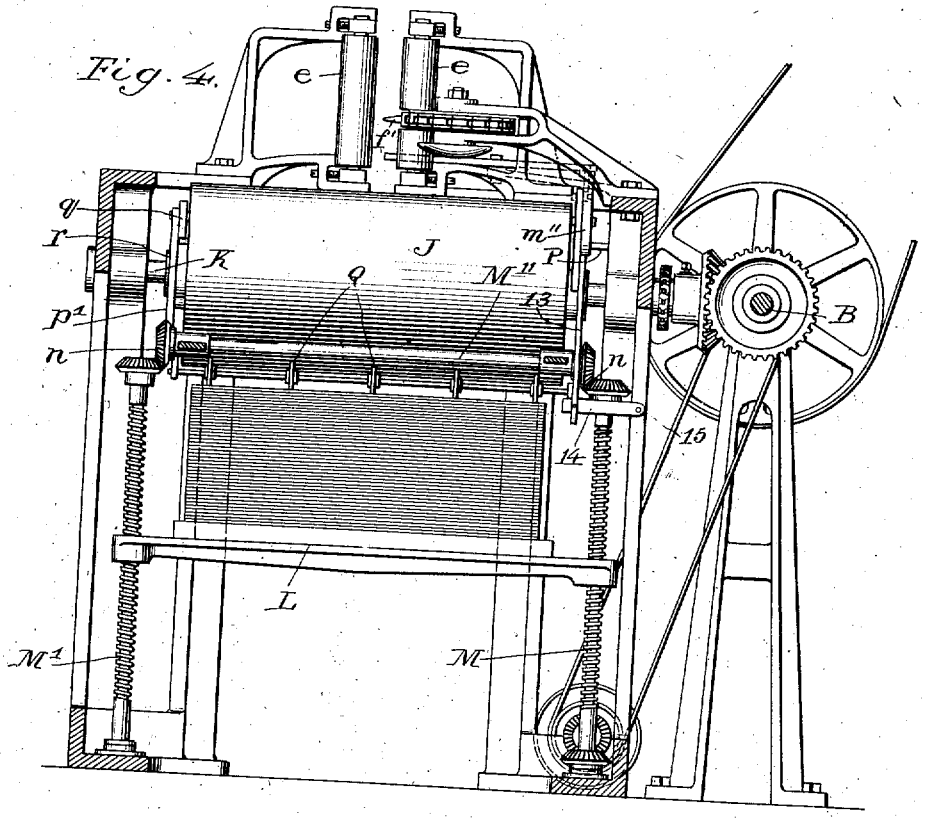
Figure 8:
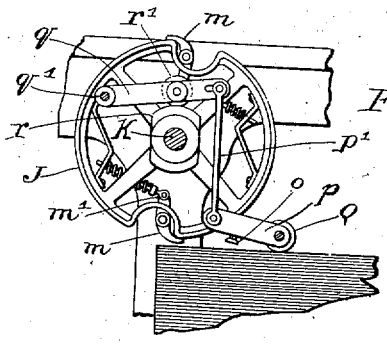

In the drawings:—Figure 1 is a side elevation of my improved machine. Fig. 2 is a top plan view, with the hopper omitted. Fig. 3 is a central vertical sectional view of the hopper end of machine, but with the hopper omitted, taken up to a point just to one side of the cylinder in the center of the machine. Fig. 4 is a vertical sectional view taken on the line 4—4 of Fig. 1 looking toward the left. Fig. 5 is a similar view taken on the line 5—5 of Fig. 1 looking toward the left or feed-hopper end of the machine. Fig. 6 are detail views of adjusting mechanism to provide for variations in the thickness of books passing through the machine. Fig. 7 is a detail in perspective to illustrate one method of "stacking" or shifting the covered books delivered from the machine. Fig. 8 is a detail view of the gripping and sheet-lifting mechanism. Fig. 9 is a detail view in perspective of the detector or sheet-lift controlling mechanism shown at one end of the cover-applying cylinder.

The machine comprises any suitable frame upon which is supported the feed-box or hopper A, which is preferably mounted above the bed-plate or top of the machine. This hopper contains the unbound books or pamphlets to be covered, which are to be fed from the bottom by means of a belt or belts *a*, which are provided at predetermined points with lugs or projections *a'*. The belt *a*, takes about rollers or pulleys *b*, *b'*; the one roller, for example roller *b*, receiving power by means of a pulley or belt, chain or other suitable mechanism, from drive-shaft B, which shaft in turn is driven by belt from the power-shaft. Drive-shaft B may be used to supply power to the different parts of the machine in any of the well known ways. The bound books are placed in the hopper or feed-box A with their backs or bound edges presented in the direction of travel of belt *a*, so that as lug or projection *a'* catches or takes against the lowest book, it will be carried by belt or chain *a* beneath roller *c* and dropped down between guides *d*, *d*, onto the bed or book race-plate C (see Fig. 5), where it passes between rollers *e*, *e*, which may be driven in any suitable manner as for example by sprocket-chains *f* which take about sprocket wheels *g*, *g'*, either one or both of said wheels being driven in any suitable manner. The rollers *e*, *e* may be mounted as shown in Figs. 5 and 6 with their ends held by the pillows or blocks *e''* *e'''*; the position of the latter being controlled by the screws $e^4$ and $e^5$ which take through the frame of the machine and into or against the pillows *e''* *e'''*. In addition to the action of the rollers to carry the books or pamphlets forward along the bed or race-plate, the chains *f* may also be provided with small lugs or fingers *f'*, arranged on the chains at predetermined points, to take against the rear edge of the book and compel its positive travel. These lugs or fingers may be so arranged as to permit of their ready adjustment at any point on the chain so as to accommodate books or pamphlets of different lengths. The books are held between the chain and rollers and fed along until they have received the cover, when they will be held between the blades or guide-rods *h*, *h'*, and angularly arranged rollers until they reach the packer or receiving tray D, at the end of the machine, see Fig. 1. As the book travels along between the rollers *e*, and the chain *f*, its sides near the back-edge come between the small horizontally arranged rollers *i*, which take against the glue-supplying disks or wheels E, E, which are suitably mounted and revolve in the glue or paste box E' mounted beneath the bed or book-race plate C; the glue or paste box E' may be of any suitable construction (see Figs. 1 and 5).

The disks or wheels E, E, are suitably mounted on a shaft F, which may be driven in any well known manner as for example by providing shaft F with bevel gear F′ meshing with bevel-gear G, mounted on the drive-shaft B, (see Figs. 2 and 5). Rollers *i* are of a thickness to correspond with the desired extent to which the covers are to be secured to the sides of the book; this extent preferably being just sufficient to cover the staples or stitches whereby the book is bound. The books or pamphlets continue traveling during this operation and are then brought with their backs into contact with glue or paste-applying wheel or disk H, which also revolves in glue or paste-box E′, or a separate box if desired, being suitably mounted on shaft H′, which may be geared up to shaft B as shown in Fig. 2; it being necessary with this glue wheel and shaft to have same revolve in a direction with the travel of the books as is true with the horizontally disposed rollers *i*, which is accomplished for example by the bevel gearing at I see Fig. 2. As there are likely to be some inaccuracies in the length of the covers, that is the covers cut a trifle shorter than the size of the book or pamphlet, so that the cover would not extend over every part of the back, it is preferable not to have the entire surface of the backs provided with glue, which has a tendency to spread; and for that reason I prefer to provide the glue applying wheel or disk H with depressions or cut-out portions as shown at *j* (Fig. 3) so that the ends of the back will not receive glue.

It is quite important in this class of machinery that the books be not provided with any glue where they are not to be covered, thus not only producing neater work, but also preventing interference with the proper working of the machine resulting from the different parts becoming filled with glue. I therefore have the mechanism so timed, that the books will be fed forward so as to have the forward edge come over one of the depressions *j* and travel at the same speed as wheel H, while the other depression *j* will come beneath the forward edge of the next succeeding book. The book having been supplied with glue or paste on its sides and back, continues in its travel past wheel H and onto belt *k*, which may be provided with narrow transverse strips or projections *k′*, or any other suitable means may be provided, so that the entire glued back edge will not come in contact with the mechanism and impede its operation.

As shown in the drawings, (see Fig. 3) the rollers *e* do not extend entirely down to the bed or book-race plate, so that these rollers will not contact with that portion of the sides that have been supplied with glue. Belt *k* takes about wheels *k″* which are actuated by chain *k‴* taking about a gear mounted on shaft H′, as shown in dotted lines in Fig. 1. Belt *k*, together with rollers *e* and chain *f*, will bring the books above cover-applying cylinder J, which is mounted on shaft K, which is geared to main drive-shaft B at *l* (see Fig. 2). As an exemplification of my invention, cylinder J is shown of such diameter that but half a revolution will be necessary to apply a cover to a book, and therefore I have shown cylinder J provided with two sets of spring controlled gripping-fingers *m* at diametrically opposite points as clearly shown in Figs. 3 and 8. These grippers *m* may be of a well known construction and are tripped by any well known type of tripping mechanism as at P, consisting of a pin or lug on the frame of the machine which engages between the bifurcations of the member *m″*; a detailed description of this feature need not be entered into. Mounted in close proximity to the cylinder J, is a sheet support-plate L, on which are piled the superimposed sheets which will constitute the covers for the books or pamphlets, as shown in Figs. 1 and 4. The plate L may be provided with screw-threaded extensions or ears through which the right and left screw-threaded rods M, M′ take, whereby the support-plate L with its superimposed sheets is automatically moved upward, rods M, M′ being turned through the action of gearing as at *n*, the gearing being mounted on shafts which are driven by a chain or belt from main drive-shaft B; rod M′ being shown as driven by shaft M″ with its bevel-gearing, this shaft in turn being driven by rod M (see Fig. 4). The purpose of this automatic vertical movement of support-plate L is to keep the top sheet of the superimposed sheets within reach of grippers *m*. Suitably mounted on the frame of the machine and near the edge of the pile of sheets beneath the cylinder J, is a pneumatic sheet-lifting mechanism comprising one or more suction-cups *o* preferably mounted on a tube or rod extending transversely of the sheet-lift. This tube or rod may extend or be secured between rocker-arms *p* (there being preferably one arm at each side of the machine) which arms are actuated by connecting link *p′*, which link is connected with and actuated by rocker-arm *q*, pivotally secured at *q′* to the frame of the machine. This arm *q* is rocked by the action of cam *r*, mounted on the shaft K, against roller *r′* secured to arm *q*. In order to permit of any necessary adjustment, the connection between connecting link *p′* and arm *q* is preferably shown as a slot and pin connection, see Fig. 8. The cam *r* is so arranged on the shaft, to which cylinder J is secured, that the sheet-lifting mechanism or cups will be pressed onto the top sheet of the pile on sheet or cover-lift L as the gripping fingers on the cylinder are approaching the sheet, and the cam *r* will lift the sheet-lifting mechanism with the edge of the top sheet just before the gripper reaches the edge of the paper. The gripper in the meantime has been "tripped" by any suitable tripping mechanism as for example that shown at P, which forces the tip of the gripping fingers away from the cylinder against the action of the spring which controls the grippers, and holds it open until it is passing over the edge of the sheet, when the fingers will be released by the tripping mechanism and through the action of the spring suddenly snap down onto the paper edge and draw the top sheet off the pile and from beneath the idlers Q, which tend to "break" the sheets and hold them firmly until the grippers carry them onto the cylinder J. The cylinder J is preferably of such size that the portion of the periphery of the cylinder between the gripping mechanisms is sufficiently large to accommodate a sheet and permit the same to lie flat against the surface.

The pneumatic sheet-lifting cups may be controlled by the action of what may be termed a "detector" arranged along the path of the book or pamphlet to be covered, and in advance of the cover-applying mechanism. The particular type of "detector" illustrated comprises the arm 9 pivoted at 10 and connected at its one or long end with rod 11, which connects with bell-crank lever 12, connected with rod 13—see Fig. 3. The lower end of this rod 13 is preferably bifurcated. Arm 14 may have one end pivoted to the frame of the machine as at 15 (see Fig. 4) while the other end takes between the bifurcations and is pivotally secured in place. The arm 14 takes beneath the extended portion of one of the arms *p*—as shown in Figs. 3 and 4—and is adapted to control the action of the arm *p* and thereby the operation of the sheet-lifting mechanism. The bell-crank lever 12 is provided with a lug 16—see Fig. 3—to which is secured spring 17, whose other end is secured to the frame of the machine. The tendency of spring 17 is to pull on lug 16 and thereby rock lever 12 toward the right in Fig. 3, which will pull rod 11 and with it arm 9 into the normal position shown in Fig. 2, with the free end extending into the path or race-way along which the pamphlets to be covered must travel. It is apparent from the foregoing description that if for any reason a pamphlet should not have been fed to the race-way during the operation of the machine, arm 9 will remain in its normal position extending into the race - way, through the action of spring 17 on lever 12, holding up rod 13 and with it arm 14; arm 14 holds up arm *p*, so that even though cam *r* has turned to the position where it would allow arm *p* and suction-cup *o* to drop, they cannot drop down and lift the top sheet of the superimposed sheets on cover-lift L.

The cylinder forces the sheet picked up against the back edge of the book which has been supplied with glue or paste. Extending over the cylinder and taking slightly below the immediate top of the cylinder, so as to extend into a plane just below the plane in which the back of the book travels, are the blades or cover-lifting members *h'*, which are twisted or formed with a flat surface presented upward as shown in Fig. 2. The ends flare outward from each other as shown in this figure, and gradually converge with the flat surface or faces assuming a vertical position to take against the sides of the book. It is evident that the cover will thus be gradually lifted against the sides of the book and held in a vertical position, while the book and cover travel forward and pass over the grooved rollers *s*, *s*, which tend to more firmly force the cover on the back of the book and also press the same against that portion of the book sides near the back that has been provided with glue or other adhesive substance.

Located along the path of the books at any suitable point intermediate of the cover-applying mechanism and the delivery end of the machine, are scorers 14ª (see Fig. 1) which are shown in the nature of a circular flange on a pair of oppositely placed rollers R, and at a point above the bed-plate which corresponds with the distance on the pamphlet-sides that have been supplied with glue. These scorers 14ª will crease or score the cover just above or adjacent to the point where it is glued to the pamphlet, so that, in opening the pamphlet, the cover will have a tendency to fold along the crease or score and thus be less likely to pull away from the book or pamphlet at the point where it is glued. It is apparent that the construction of the scoring mechanism may be altered, but it is thought that the form selected is about the simplest in connection with the type of machine illustrated.

R, R, are sets of rollers preferably arranged at an angle as shown for the purpose hereinafter set forth. The rollers may be adjustably arranged to accommodate books of different thickness and may be also yieldingly held to provide for slight variations in thickness. As the books pass between these rollers they are not only carried forward toward the packer or receiving tray D, but are also put under an even pressure to insure the thorough "setting" of the glue or paste; and with the rollers inclined as shown, the tendency of the cover to buckle is prevented by reason of the manner in which the pressure is applied. The books continue in a constant movement from the time they are fed from hopper A, through the action of belts, chains and rollers, or other suitable means, until they have been covered and delivered in the packer or receiving tray D, thus providing a continuous operating machine free from any vibrations or jars caused by the frequent stops necessary in the intermittently acting machines at present in use; and the devices *s*, R and 14ª act to effectively fold, bend or "break" the covers against the sides of the pamphlet.

The packer D may be of any suitable design and might be made to travel along a screw-rod S, which may have a constant or intermittent motion in accord with the speed of the machine; the packer moving along on rollers in the run-way or frame T secured to the side of the machine. Should the shaft or rod S travel too fast, the packer may be disengaged and moved backward by lifting the weighted screw-threaded follower or arm U, as is evident from the construction shown in Fig. 7. It is apparent from that figure that the packer will be slightly shifted so as to present an unobstructed portion for the next succeeding book.

With my invention a machine is provided which will be continuous in its operation; the books being fed forward, glued, and provided with covers, which are also folded up against the book-sides, and the book with its cover put under pressure, without a break or stop in the operation of the machine, thus providing a machine of greater capacity than is true of those at present in use.

I have illustrated and described one form of machine embodying my invention, but it is understood that the machine may be altered in a number of details without departing from the spirit of my invention, and I do not wish to be understood as limiting myself to the exact construction shown and described; but What I do claim as my invention and wish to secure by Letters Patent, is:—

1. A machine for covering pamphlets and the like comprising a feeding mechanism, a race-way for the pamphlets, mechanism located adjacent to said race-way whereby glue is applied to the pamphlet-backs and sides for a predetermined distance, means revolving adjacent to the race-way adapted to bring a cover sheet against the glue-supplied portions of the pamphlet, and means arranged in the path of the cover-supplied pamphlet whereby the covers are scored.

2. A machine for covering pamphlets and the like comprising a hopper to receive the pamphlets, means for feeding the pamphlets forward, mechanism located in the path of the pamphlets fed through the machine whereby glue is applied to the backs and sides for a predetermined distance, mechanism located adjacent to the path of the pamphlets supplied with glue whereby a cover sheet is brought into contact with the glue-supplied portions of the pamphlet, and means operatively connected with the cover-applying mechanism and located in the path of the pamphlets to be covered and in advance of the cover-applying mechanism, said means being adapted to be operated by the passing pamphlets whereby the operation of said cover-sheet lifting mechanism is effected.

3. A machine for covering pamphlets and the like provided with a race-way, means for feeding the pamphlets to be covered to said race-way in a vertical position with the backs downward, mechanism located in the path of the pamphlets whereby glue is applied to the backs and for a predetermined distance on the sides of the pamphlet, means for lifting a cover and bringing it into position against the glue-supplied portions of the pamphlet, mechanism for pressing the cover against the glue-supplied portions, and means for carrying the pamphlets in unbroken travel from said hopper to the delivery end of the machine.

4. A machine for covering pamphlets and the like comprising means for feeding forward the pamphlets to be covered, mechanism for maintaining the pamphlets in a vertical position with the back presented downwardly, means for applying glue to the pamphlet-backs and to the sides for a predetermined distance, means rotating in the path of the pamphlet for automatically withdrawing a cover-sheet from a pile of sheets arranged adjacent thereto and applying the same to the pamphlet-back, mechanism for receiving the back and adjacent sides of the pamphlet to press the same, and means for carrying the pamphlets continuously past said paste and cover-applying devices in uninterrupted travel from the hopper to the packer or receiving tray.

5. A machine for covering pamphlets and the like comprising feeding mechanism for feeding the pamphlets forward, adhesive-substance-applying mechanism arranged adjacent to the path through which the pamphlets are fed whereby a predetermined portion of the backs and sides are supplied with adhesive substance, means for gripping a sheet and applying it to the adhesive-supplied portions of the pamphlet, means for holding the cover against the pamphlet sides, and mechanism for pressing the back and adjacent side edges and carrying the covered pamphlet toward the delivery end of the machine.

6. A machine for covering pamphlets and the like having a race-way, and comprising mechanism for feeding the pamphlets to said race-way in a vertical position with the back presented downwardly, means for applying glue to a portion of the sides and back, side-engaging mechanism for holding the pamphlets in their vertical position and feeding them forward, a cover-attaching means arranged beneath said race-way and adapted to apply the cover to the pamphlet-back, and mechanism for pressing the cover and glued portions of the pamphlet and folding the cover up against the sides.

7. A machine for covering pamphlets and the like provided with a race-way, and comprising a hopper for receiving the uncovered pamphlets, means whereby the pamphlets are fed from the bottom of the hopper one at a time and delivered to said race-way in a vertical position, mechanism for engaging the sides of the pamphlets to feed them toward the delivery end of the machine, glue-applying mechanism located adjacent to said race-way and taking into the path of the pamphlets, said mechanism being adapted to apply glue for a predetermined distance on the sides and backs, a sheet-lifting and applying means arranged to revolve in the path of the pamphlets whereby a sheet is forced against the glue-supplied bottom of the pamphlets to form a cover, and mechanism arranged beyond said sheet-lifting and applying means and adapted to press the back and adjacent side edges of the cover and pamphlet to induce a firm union between pamphlet and cover.

8. A machine for covering pamphlets and the like comprising a hopper to contain the pamphlets to be covered, mechanism for taking the lower-most pamphlet from the hopper and feeding it to the machine in a vertical position with the back downward, means for carrying the pamphlets through the machine without interruption, a receptacle containing adhesive substance, mechanism located intermediate of the receptacle and the path traversed by the pamphlets whereby adhesive substance is applied to the pamphlet-sides and back for a predetermined distance, means for carrying the adhesive supplied pamphlets forward, mechanism, located adjacent to the path of the pamphlets and moving in the direction traveled by them, whereby a cover is applied to the pamphlet back, and means adapted to engage the backs and sides to press the cover firmly into place.

9. A machine for covering pamphlets and the like comprising a race-way, a hopper to contain the pamphlets to be covered, mechanism taking beneath the hopper and in engagement with the bottom pamphlet and adapted to feed the pamphlet, means for receiving the pamphlet from said mechanism and delivering the same in a vertical position to the race-way of the machine, paste-applying mechanism taking into the path of the pamphlet and adapted to apply adhesive substance for a predetermined distance on the pamphlet back and sides, sheet-lifting mechanism, and means for applying the top-most sheet on the sheet-lift to the back and sides of the pamphlet.

10. In a machine for covering pamphlets and the like, a hopper for receiving the pamphlets to be covered, movable mechanism located adjacent to the bottom of the hopper and adapted to carry the lower-most pamphlet from beneath the hopper, a race-way for the pamphlets, means intermediate of the race-way and said mechanism whereby the pamphlets are delivered from the mechanism to said race-way in a vertical position, glue-applying mechanism taking into the race-way whereby predetermined parts of the back and sides of the pamphlet are provided with glue, and means revolving adjacent to the bottom of the race-way for bringing a cover-sheet into contact with the portions of the pamphlet provided with glue.

11. In a machine for covering pamphlets and the like, a hopper for receiving the pamphlets to be covered, means traveling underneath the hopper and adapted to feed the lower-most pamphlet from the hopper, glue-applying rollers arranged to revolve in the path of the pamphlets, revolving mechanism adjacent to the path of the pamphlets, adapted to present a cover-sheet to the surfaces of the pamphlet provided with glue, and means for carrying the pamphlets through the machine from the feeding mechanism to the delivery-end of the machine.

12. In a machine for covering pamphlets and the like, a race-way for the pamphlets, means for feeding the pamphlets to the race-way in a vertical position, a paste-receptacle located beneath said race-way, mechanism mounted beneath said race-way and revolving intermediate of said receptacle and race-way and adapted to apply paste to a predetermined extent on the pamphlet sides and back, a cover-sheet-carrying mechanism, and a cylinder revolving intermediate of the last-mentioned mechanism and the race-way, adapted to carry the upper-most sheet from said sheet-carrying mechanism and force it against the paste-supplied portions of the pamphlet.

13. In a machine for covering pamphlets and the like, a race-way for the pamphlets, a hopper or feed-box for the pamphlets, mechanism movably mounted beneath the hopper and arranged to receive the lower-most pamphlet from the hopper and feed the same to the race-way, a paste-receptacle mounted beneath the race-way, mechanism revolubly mounted intermediate of the receptacle and race-way and adapted to apply paste to the pamphlets passing along the race-way, a cover-sheet carrying mechanism, a cylinder, provided with gripping mechanism, revolving intermediate of said carrying mechanism and the race-way and adapted to carry the upper-most sheet from the carrying mechanism into the path of the pamphlet and force the same into contact with the paste-supplied portions of the pamphlets.

14. A machine for covering pamphlets and the like, provided with a race-way, means for feeding the pamphlets to said race-way, a glue-receptacle mounted adjacent to said race-way, mechanism revolving intermediate of the race-way and said receptacle whereby glue is applied to the pamphlet-sides, and means revolving in the receptacle and taking into the race-way whereby glue is applied to the pamphlet-back, said mechanism and means being so arranged as to contact with the pamphlet sides and back to a predetermined extent.

15. A machine for covering pamphlets and the like, provided with a race-way, a glue-receptacle located adjacent to said race-way, and revolubly mounted glue rollers, intermediate of the receptacle and race-way, some of the rollers being arranged to contact for a predetermined distance with the sides of the pamphlets, while another roller is arranged to contact to a predetermined extent with the back of the pamphlets and apply glue thereto.

16. A machine for covering pamphlets and the like, provided with a race-way for the pamphlets, a glue-receptacle located adjacent to said race-way, and rollers mounted on horizontal and vertical axes and revolving intermediate of the receptacle and race-way, the rollers mounted on the vertical axes being arranged to apply glue to the sides of the pamphlet, while one of the rollers mounted on a horizontal axis is arranged to apply glue for a predetermined distance on the pamphlet-back.

17. A machine for covering pamphlets and the like, provided with a race-way for the pamphlets, a glue receptacle located adjacent to said race-way, a set of rollers arranged in said receptacle and mounted on horizontal axes, a set of rollers mounted on vertical axes and revolving intermediate of the first mentioned rollers and race-way and adapted to apply glue to the sides of the pamphlets passing in said race-way, and a roller mounted on a horizontal axis arranged intermediate of the receptacle and bottom of the race-way whereby glue is applied to the backs of the pamphlets passing in said race-way.

18. A machine for covering pamphlets and the like, having a race-way for the pamphlets to be covered, a cylinder revolubly mounted beneath the race-way and provided with grippers on the periphery thereof, means for receiving the cover-forming sheets, located adjacent to said cylinder and arranged to move vertically, and means for lifting the cover-forming sheets into contact with the grippers, arranged intermediate of the sheets on the first mentioned means and the race-way, and adapted to be operated by the pamphlet passing along the race-way and be brought into contact with the topmost sheet of said first mentioned means.

19. A machine for covering pamphlets and the like, having a race-way for the pamphlets to be covered, a cylinder provided with sheet-engaging means, vertically movable mechanism located adjacent to the cylinder for carrying the cover-forming sheets, mechanism intermediate of the cylinder and said vertically movable mechanism for lifting the topmost sheet into engagement with the sheet-engaging means on the cylinder, and means arranged to operate when the cylinder reaches a predetermined point in its revolution, said means having operative engagement with the lifting mechanism, so that the latter is operated when the cylinder reaches a predetermined point in its revolution.

20. A machine for covering pamphlets and the like provided with a race-way for the pamphlets to be covered, and comprising a feed-mechanism whereby the pamphlet is fed to said race-way with its back presented downwardly, means revolving adjacent to said race-way and adapted to provide the pamphlet sides and back with glue to a predetermined extent, a cylinder provided with means to grip the cover-forming-sheets and bring them singly into contact with the pamphlet-back, mechanism arranged beyond the cylinder and in the path of the pamphlet passing along said race-way, adapted to press the cover onto the portions of the pamphlet supplied with glue, and rollers adjacent to the path of the pamphlets whereby the latter are subjected to pressure.

21. A machine for covering pamphlets and the like comprising a race-way, a hopper to receive the pamphlets to be covered, movable means located beneath the hopper and on which the superimposed pamphlets rest, whereby the lowest pamphlet is fed from the hopper, means arranged to receive the pamphlets fed from the hopper and direct them to said race-way, glue-applying mechanism arranged along the race-way whereby glue is applied to the pamphlet-backs and sides for a predetermined distance, and means whereby a cover-sheet is brought into contact with the glue-supplied portions of the pamphlet as the latter travels along the race-way.

22. A machine for covering pamphlets and the like comprising a feeding mechanism, a race-way for the pamphlets, mechanism located adjacent to said race-way whereby glue is applied to the pamphlet-backs and sides for a predetermined distance, means revolving adjacent to the race-way adapted to bring a cover-sheet against the glue-supplied portion of the pamphlet, means arranged in the path of the covered pamphlet whereby the covers are scored, and mechanism for engaging the sides of the covered pamphlet to subject it to pressure and feed it to the delivery-end of the machine.

23. A machine for covering pamphlets and the like comprising a race-way, a hopper for the pamphlets to be covered, means movably mounted adjacent to one end of the hopper and against which the pamphlets bear whereby the adjacent pamphlet is fed from the hopper and delivered to said race-way, glue-applying mechanism arranged along the race-way whereby glue is applied to the pamphlets at prearranged points, means whereby a cover-sheet is brought into contact with the glue-supplied portions of the pamphlets, and means for applying pressure to the cover where it is glued to the pamphlet.

24. A machine for covering pamphlets and the like comprising a race-way for the pamphlets, glue-applying mechanism located adjacent to and taking into said race-way, cover-applying mechanism revolving adjacent to the race-way for bringing the cover sheet into contact with the glue-supplied portions of the pamphlets passing along the race-way, means taking onto the topmost sheet and adapted to lift the edge thereof, mechanism operatively connected with said means whereby the latter is intermittently operated, and means extending into the race-way in advance of the cover-applying mechanism, said means being loosely held in normal position and arranged to be moved out of the race-way by a pamphlet passing along the race-way, said means having operative connection with the first-mentioned means whereby the latter is held against the action of the mechanism which intermittently operates said means.

25. A machine for covering pamphlets and the like comprising a race-way, glue-applying mechanism located along said race-way, a cover-applying device revolving adjacent the race-way, a sheet-lifting mechanism located adjacent to said device whereby the cover-sheets are brought into contact with the cover-applying device, and pivotally mounted means extending into said race-way in advance of the cover-applying device and in the path of the uncovered pamphlet so as to be actuated thereby, said means being operatively connected with said sheet-lifting mechanism whereby the latter is operated when said means is actuated by the passing pamphlet.

26. A machine for covering pamphlets and the like, provided with a race-way for the pamphlets, mechanism located adjacent to the race-way whereby glue is applied to the pamphlets, means adapted to bring a cover-sheet against the glue supplied portions of the pamphlet, and mechanism located in the path of the cover-supplied pamphlet whereby the cover is scored adjacent to the glued portion thereof.

27. A machine for covering pamphlets and the like including in combination, a continuously advancing pamphlet conveyer having a series of jutting-out fingers arranged to engage transversely behind the successive pamphlets, a pamphlet infeeding mechanism adapted to introduce the successive pamphlets to positions in front of such advancing fingers, adhesive applying means acting to apply adhesive to the rear margins of both sides of the pamphlet and to the back of the pamphlet, and mechanism for applying covers to the continuously advanced pamphlets.

28. A machine for covering pamphlets and the like including in combination, a continuously advancing pamphlet conveyer having a series of traveling transverse members arranged to engage behind the successive pamphlets, a pamphlet infeeding mechanism adapted to introduce successive pamphlets to positions in front of the respective traveling members by a pamphlet movement at an angle to the conveyer travel, adhesive applying means acting to apply adhesive to the rear margins of both sides of the pamphlet and to the back of the pamphlet, and mechanism for covering each continuously advanced pamphlet.

29. A machine for covering pamphlets or the like including in combination, a container for adhesive, means for removing adhesive therefrom and applying the same along the back and the rear margin of both sides of the pamphlet, mechanism for subsequently applying a cover to the back of the pamphlet, and mechanism for subsequently breaking the sides of the cover against the glued sides of the pamphlet.

30. A machine for covering pamphlets and the like including in combination, mechanism for applying adhesive along the back and rear margins of both sides of the pamphlet, mechanism for subsequently applying a cover to the back of the pamphlet, mechanism for subsequently breaking the sides of the cover against the glued sides of the pamphlet, all of said three mechanisms adapted to operate during the travel of the pamphlet, and means for continuously advancing a pamphlet throughout the operations of said mechanisms.

31. A machine for covering pamphlets and the like including in combination, means for advancing a pamphlet to be covered, a roller for carrying and applying adhesive to the pamphlet, said roller being peripherally recessed at such point as to omit the application of adhesive at the extreme ends of the advancing pamphlets, and mechanism for subsequently applying a cover to the pamphlet.

32. A machine for covering pamphlets and the like including in combination, means for feeding pamphlets from a source of pamphlet supply, mechanism receiving a pamphlet from said means and continuously advancing the same through the machine to the delivery point thereof, a container for adhesive and means for removing the adhesive therefrom and applying the same to the back of the pamphlet, and mechanism for applying a cover to the advancing pamphlet progressively acting from one end of the pamphlet to the other.

33. A machine for covering pamphlets and the like including in combination, means for feeding pamphlets from a source of pamphlet supply, mechanism receiving a pamphlet from said means and continuously advancing the same through the machine to delivery point thereof, a container for adhesive and means for removing the adhesive therefrom and applying the same to the back of the pamphlet, mechanism for feeding a cover to the pamphlet, and a device controlled by the presence of a pamphlet for controlling the operativeness of said cover feeding means.

34. A machine for covering pamphlets and the like including in combination, means for feeding pamphlets from a source of pamphlet supply, mechanism receiving a pamphlet from said means and continuously advancing the same through the machine, a container for adhesive and means for removing the adhesive therefrom and applying the same to the back of the pamphlet, and mechanism comprising a rotary device for applying a cover to the advancing pamphlet progressively acting from one end of the pamphlet to the other, the same comprising peripheral cover-gripping means for carrying the successive covers around the arc of a circle tangent to the path of the backs of the pamphlets.

35. In a book covering machine, the combination of means for feeding books from a source of book supply, means for advancing a series of books in a definite path through the machine, a container for adhesive, means for removing the adhesive therefrom and applying the same to the back of each pamphlet, a support for a supply of covers, means for separating successive cover sheets from the supply, and a cover applying cylinder having its peripheral surface so disposed that the line of movement of the backs of the advancing books is tangent to the cylinder whereby to press the covers into firm engagement with the backs of the advancing books.

36. In a book covering machine, means for advancing a series of books in a definite path, adhesive applying means arranged to apply an adhesive to the backs of the advancing books, a support for a supply of covers, means for separating successive cover sheets from the supply, and a cover applying cylinder disposed beneath the book path and having its peripheral surface so disposed that the line of movement of the backs of the advancing books is tangent to the cylinder whereby to press the covers into firm engagement with the backs of the books.

37. A book covering machine comprising, the combination with means for advancing a series of books in a definite path, adhesive applying means arranged to apply an adhesive to the backs of the advancing books, of a support for a supply of covers, means for separating successive cover sheets from the supply, and a cover applying cylinder having its peripheral surface so disposed that the line of movement of the backs of the advancing books is tangent to the cylinder, said cylinder moving when pressing the cover in the same direction with the advancing movement of the book conveyer and arranged to press each cover progressively along its full length into engagement with the back of the book.

38. A book covering machine, comprising, the combination with means for advancing a series of books in a definite path, adhesive applying means arranged to apply an adhesive to the backs of the advancing books, of a support for a supply of covers, means for separating successive cover sheets from the supply, and a cover applying cylinder disposed beneath the book path so that the line of movement of the backs of the advancing books is tangent to the upper surface of the cylinder, said cylinder arranged to receive the covers on its surface and to carry the covers up into engagement with the backs of the books.

39. A book covering machine comprising, means for feeding books from a source of book supply, means for advancing a series of books in a definite path through the machine, a container for adhesive, means for removing the adhesive therefrom and applying the same to the back of each pamphlet, a support for a supply of covers, means for separating successive cover sheets from the supply, and a cover applying cylinder disposed substantially in the line of movement of the backs of the advancing books for applying and pressing each cover into engagement with the back of the advancing book progressively from one end of the book to the other.

40. A book covering machine comprising, means for advancing a series of books in a definite path, adhesive applying means adapted to apply an adhesive to the backs of the advancing books, a support for a supply of covers, means for separating successive cover sheets from the supply, and a cover applying cylinder disposed substantially in the line of movement of the backs of the books carried by the book conveyer for applying and pressing each cover into engagement with the back of the advancing book progressively from one end of the book to the other.

41. In a machine for covering pamphlets and the like, a mechanism adapted to feed the pamphlets to the pamphlet carrying means, glue-applying means arranged to operate in the path of the pamphlets, a cover-sheet-supply support, means for separating successive cover-sheets from the supply, revolving mechanism adjacent to the path of the pamphlets, adapted to present each cover-sheet to the glued surface of the corresponding pamphlet, and means for carrying the pamphlets through the machine from the feeding mechanism to the delivery point of the machine.

42. In a machine for covering pamphlets and the like, a mechanism adapted to feed the pamphlets to the pamphlet carrying means, glue-applying means arranged to operate in the path of the pamphlets, a cover-sheet-supply support, means for separating successive cover-sheets from the supply to be applied to the traveling pamphlets, a revolving cylinder adjacent to the path of the pamphlets, adapted to carry around its surface and present and force each cover sheet to the glued surface of the corresponding pamphlet, and means for carrying a series of pamphlets through the machine from the feeding mechanism to the delivery point of the machine.

43. A machine for covering pamphlets and the like including in combination, means for feeding pamphlets from a source of pamphlet supply, means receiving and conveying a succession of pamphlets with their backs exposed downwardly, a container for adhesive, means for removing the adhesive therefrom and applying the same to the backs of the pamphlets, means located adjacent the pamphlet conveying means for breaking both sides of the cover against the sides of the pamphlet, a sheet feeding means for removing covers from a supply and feeding them one by one, the same being located substantially lower than said breaking mechanism, and a rotary cylinder for carrying the successive covers one by one up to the pamphlet path in front of the breaking mechanism and applying them in an advancing direction to the pamphlet progressively from one end of the pamphlet to the other.

44. A machine for covering pamphlets and the like including in combination, means for feeding pamphlets from a source of pamphlet supply, means receiving therefrom and continuously advancing a succession of pamphlets, a container for adhesive, means for removing the adhesive therefrom and applying the same to the backs of the pamphlets, a support for a supply of covers, means receiving successive covers from the supply and applying the same to the backs of the pamphlets, and means moving with a rotary motion for breaking both cover sides against the sides of each pamphlet during the continuous travel of the latter.

45. A machine for covering pamphlets and the like including in combination, means for feeding pamphlets from a source of pamphlet supply, means receiving therefrom and for advancing through the machine a succession of pamphlets with a continuous motion, a container for adhesive, means for removing the adhesive therefrom and applying the same to the back of the pamphlets, a support for a supply of covers, cover-applying means progressively acting from one end of the pamphlet to the other, and means for breaking the cover of the pamphlet during the travel of the latter.

46. A machine for covering pamphlets and the like including in combination, means for feeding pamphlets from a source of pamphlet supply, means for continuously advancing the pamphlets throughout the adhesive applying and covering operations thereon, a container for adhesive, means for removing the adhesive therefrom and applying the same to the backs of the pamphlets, rotary mechanism for applying a cover to each pamphlet progressively from one end to the other during its forward travel, and mechanism for breaking both sides of each cover against the sides of the pamphlet during its forward travel.

47. A machine for covering pamphlets and the like including in combination, means for feeding pamphlets from a source of pamphlet supply, means for continuously advancing the pamphlets throughout the adhesive applying and cover applying and breaking operations thereon, a container for adhesive, means for removing the adhesive therefrom and applying the same to the backs of the pamphlets, mechanisms for applying a cover to the back of each pamphlet to which glue has been applied during its forward travel, and rotary means for breaking both sides of each cover against the sides of each pamphlet during its forward travel.

48. A machine for covering pamphlets and the like including in combination, means for feeding pamphlets from a source of pamphlet supply, means for continuously advancing the pamphlets throughout the adhesive applying and cover-applying and breaking operations thereon, a container for adhesive, means removing the adhesive therefrom and applying the same to the back of each book progressively from one end to the other, mechanism for applying a cover to each pamphlet progressively from one end to the other during its forward travel, and mechanism for breaking both sides of each cover against the sides of the pamphlet progressively from one end to the other during its forward travel.

PETER PACHTER.

Witnesses:

N. A. STREET,
G. HEIDMAN.